(12) United States Patent
Baba

(10) Patent No.: US 6,518,691 B1
(45) Date of Patent: Feb. 11, 2003

(54) AREA TYPE LIGHT EMITTING DEVICE AND MANUFACTURING METHOD THEREOF

(75) Inventor: Masatake Baba, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/575,093

(22) Filed: May 19, 2000

(30) Foreign Application Priority Data

May 31, 1999 (JP) .......................................... 11-153058

(51) Int. Cl.⁷ ................................................. H01J 9/00
(52) U.S. Cl. ........................ 313/113; 313/114; 313/634
(58) Field of Search ................................. 313/113, 114, 313/634, 491, 573

(56) References Cited

U.S. PATENT DOCUMENTS 4,702,717 A  * 10/1987 Morris et al. .................. 445/27

FOREIGN PATENT DOCUMENTS

| JP | S62-99932 | 9/1987 |
| JP | HEI 4-191704 | 7/1992 |
| WO | WO 98/54606 | 3/1998 |

* cited by examiner

Primary Examiner—Vip Patel
Assistant Examiner—Ken A Berck
(74) Attorney, Agent, or Firm—Scully, Scott, Murphy & Presser

(57) ABSTRACT

An area type light emitting device, in which a reflection component can be firmly fixed to a transparent light guide component, and the manufacturing cost of the device can be reduce, is provided. At the area type light emitting device, in which the reflection component is disposed on the reverse face of the transparent light guide component, and also a light source is disposed at the side of the transparent light guide component, makes light emit from the surface of the transparent light guide component by that emitted light from the light source is inputted to the transparent light guide component and the inputted light is reflected on the reflection component and the reflected light is passed through the surface of the transparent light guide component, at the time when a reflection pattern, which makes the emitted light from the light source reflect to the surface of the transparent light guide component, is formed on the reverse face of the transparent light guide component, the reverse face of the transparent light guide component and the reflection component are fixed by welding in a state that the reflection pattern is formed between the reverse face of the transparent light guide component and the reflection component.

3 Claims, 4 Drawing Sheets

BEFORE WELDING

AFTER WELDED

AREA TYPE LIGHT EMITTING DEVICE AND MANUFACTURING METHOD THEREOF

BACKGROUND OF THE INVENTION

The present invention relates to an area type light emitting device and a manufacturing method thereof, which are used for a transmission type display unit that does not emit light for itself such as a liquid crystal display (LCD) unit.

Description of the Related Art

An area type light emitting device is required to have important factors, such as a low cost, not having non-uniformity of brightness, and having a high luminance. FIG. 1 is a sectional view of a conventional area type light emitting device. As shown in FIG. 1, the conventional area type light emitting device consists of a light source 100, a reflector 102, and a light guide unit 201. And the light guide unit 201 consists of a light guide component 202, a diffusion component 204, a reflection component 206, a reflection pattern 208, and an adhesive 210.

At the conventional light guide unit 201, the reflection pattern 208, which makes emitted light from the light source 100 reflect irregularly or regularly, is formed by transferring a pattern used a screen printing on the reverse side (the side existing the reflection component 206) of the light guide component 202. Or the reflection pattern 208 is formed on the light guide component 202 by that the reflection pattern 208 is also formed in a molding die forming the light guide component 202.

However, at this conventional light guide unit 201, the reflection component 206 is fixed to the light guide component 202 by using the adhesive 210 such as a both sides adhesive tape on the edge sides of the reflection component 206. Consequently, displacement, bending, and deformation of the reflection component 206 occur for the light guide component 202 under a high temperature environment. Therefore, this is not enough for keeping good quality.

Japanese Patent Application Laid-Open No. HEI 4-191704 discloses an area type light emitting device and a manufacturing method thereof In this application, a transparent pattern adhesive layer, which is a reflection pattern whose reflection area becomes larger corresponding to farther the distance from a light source, is provided between a light guide component and a reflection component. And this transparent pattern adhesive layer works as the reflection pattern of the reverse side of the light guide component and also works as a means for fixing the reflection component to the light guide component. Therefore, this structure is effective for reducing a cost and for decreasing the non-uniformity of the brightness of the area type light emitting device.

However, this area type light emitting device uses an adhesive means as a fixing means for fixing the reflection component to the light guide component, therefore, the non-uniformity of the brightness occurs depending on the condition of environment, that is, the problem at the conventional method is not solved completely. This conventional method uses an adhesive whose main material is a resin as the transparent pattern adhesive layer. Consequently, for example, at a high temperature environment, this adhesive is softened and the reflection component is displaced or deformed by its own weight or its structure for the light guide component, as a result, a non-uniform gap occurs between the light guide component and the reflection component.

FIG. 2 is a perspective view of a disassembled LCD unit used an area type light emitting device. As shown in FIG. 2, the LCD unit provides a LCD panel unit 300, a front bezel 302, an area type light emitting device 200, and a frame 304, and the frame 304 has an opening part 306. In order to reduce the total weight of the LCD unit, there is a case that the frame 304 holding the area type light emitting device 200 is formed as a rectangular frame. Therefore, the reflection component 206 is displaced or deformed in the opening part 306 of the frame 304 by a high temperature environment and this causes a problem that hazy nonuniformity or an extraordinary bright part being a bright spot state occurs on the LCD unit.

Further, at the manufacturing process of this area type light emitting device, there is a process to fix the reflection component 206 to the light guide component 202 by using an adhesive, or a process to form a reflection pattern by printing in addition to a process to fix the reflection component 206 to the light guide component 202. Therefore, the manufacturing cost will not be reduced largely.

SUMMARY OF THE INVENTION

It is therefore an object of the present invention to provide an area type light emitting device and a manufacturing method thereof, in which a reflection component can be firmly fixed to a light guide component and the manufacturing cost can be reduced.

According to a first aspect of the present invention, at an area type light emitting device, in which a reflection component is disposed on the reverse face of a transparent light guide component, and also a light source is disposed at the side of said transparent light guide component, makes light emit from the surface of said transparent light guide component by that emitted light from said light source is inputted to said transparent light guide component and said inputted light is reflected on said reflection component and said reflected light is passed through said surface of said transparent light guide component, at the time when a reflection pattern, which makes said emitted light from said light source reflect to said surface of said transparent light guide component, is formed on said reverse face of said transparent light guide component, said reverse face of said transparent light guide component and said reflection component are fixed by welding in a state that said reflection pattern is formed between said reverse face of said transparent light guide component and said reflection component. Therefore, said reflection component can be firmly fixed to said transparent light guide component, and the manufacturing cost can be reduced.

According to a second aspect of the present invention, at a manufacturing method of an area type light emitting device, in which a reflection component is disposed on the reverse face of a transparent light guide component, and also a light source is disposed at the side of said transparent light guide component, makes light emit from the surface of said transparent light guide component by that emitted light from said light source is inputted to said transparent light guide component and said inputted light is reflected on said reflection component and said reflected light is passed through said surface of said transparent light guide component, at the same time when a reflection pattern, which makes said emitted light from said light source reflect to said surface of said transparent light guide component, is formed on said reverse face of said transparent light guide component, said reverse face of said transparent light guide component and said reflection component are fixed by welding in a state that said reflection pattern is formed between said reverse face of said transparent light guide component and said reflection component. Therefore, a process that said reflection component is jointed with said transparent light guide component and a process that said reflection pattern is formed on said transparent light guide component can be unified, consequently, the manufacturing cost can be reduced and said reflection component can be firmly fixed to said transparent light guide component.

According to a third aspect of the present invention, at a manufacturing method of an area type light emitting device, in which a reflection component is disposed on the reverse face of a transparent light guide component, and also a light source is disposed at the side of said transparent light guide component, makes light emit from the surface of said transparent light guide component by that emitted light from said light source is inputted to said transparent light guide component and said inputted light is reflected on said reflection component and said reflected light is passed through said surface of said transparent light guide component, at the same time when said transparent light guide component is molded, a reflection pattern, which makes said emitted light from said light source reflect to said surface of said transparent light guide component, is formed on said reverse face of said transparent light guide component, and said reverse face of said transparent light guide component and said reflection component are fixed by welding in a state that said reflection pattern contacts with said reflection component. Therefore, a process that said reflection pattern is formed on said reverse face of said transparent light guide component is not required, consequently the manufacturing cost can be reduced, and said reflection component can be firmly fixed to said transparent light guide component by welding.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
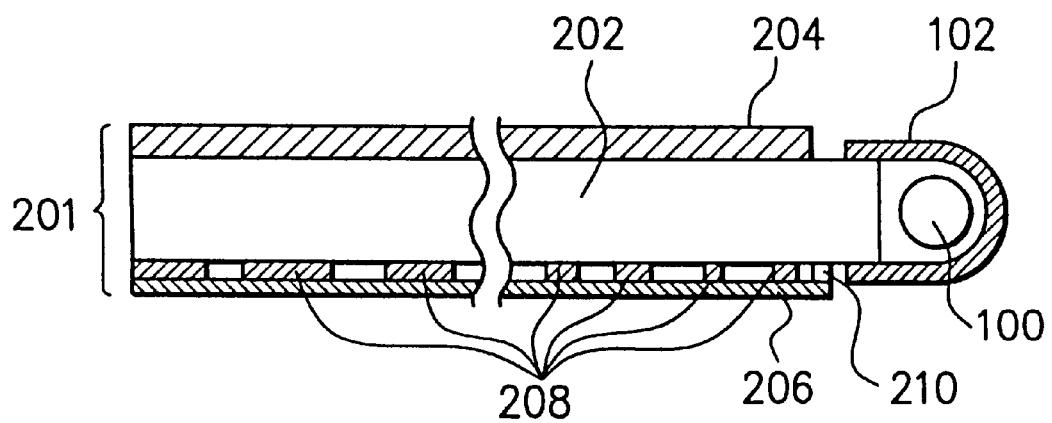
FIG. 1 is a sectional view of a conventional area type light emitting device.
Figure 2:
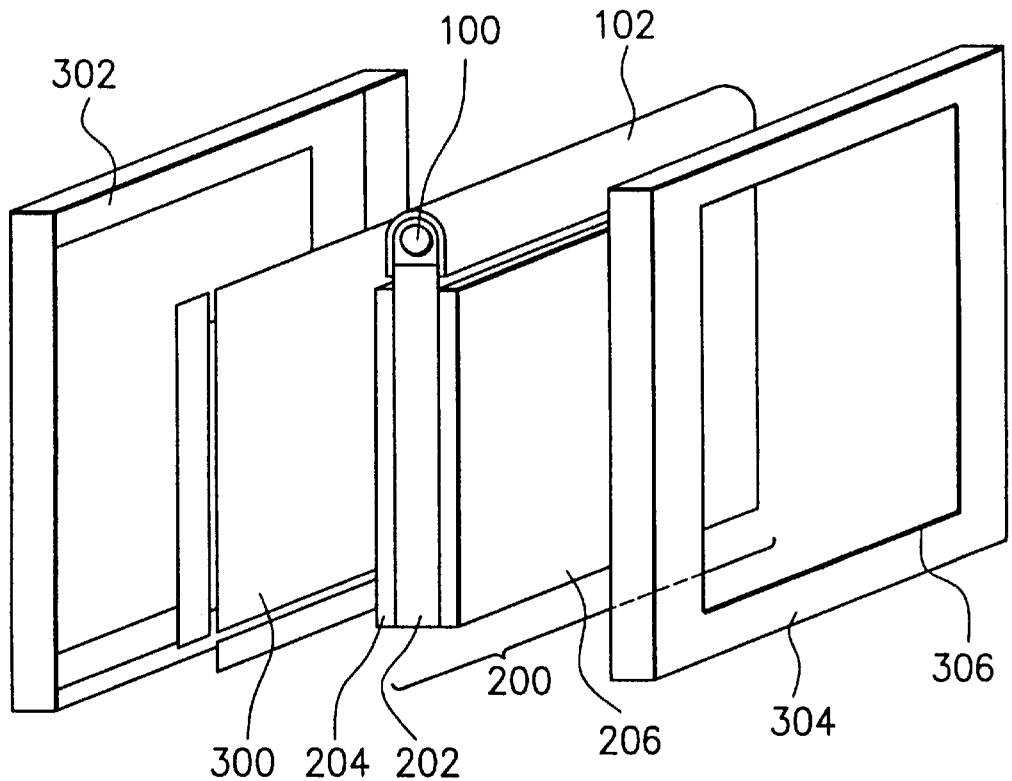
FIG. 2 is a perspective view of a disassembled LCD unit used an area type light emitting device.
Figure 3:
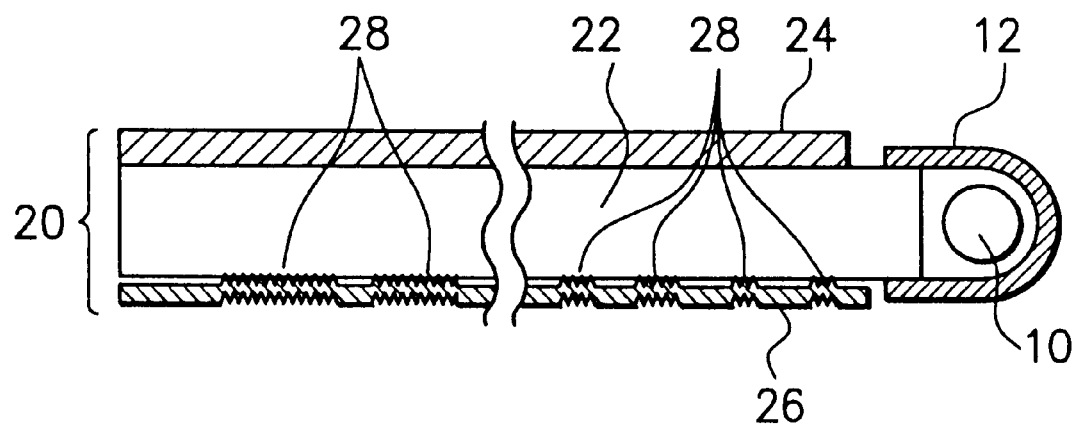
FIG. 3 is a sectional view of a first embodiment of an area type light emitting device of the present invention.

Referring now to the drawings, embodiments of the present invention are explained in detail. FIG. 3 is a sectional view of a first embodiment of an area type light emitting device of the present invention. As shown in FIG. 3, the area type light emitting device of the first embodiment of the present invention consists of a pole type light source 10, a reflector 12 which reflects emitted light from the pole type light source 10 effectively, and a light guide unit 20 which makes light diffuse uniformly.

The light guide unit 20 consists of a transparent light guide component 22, a diffusion component 24, a reflection component 26, and a reflection pattern 28. The transparent light guide component 22 is made of a transparent resin material. And the reflection pattern 28 being a dot type, or a line type, or a random satin finish, which makes the emitted light from the light source 10 that is disposed at the side of the transparent light guide component 22 reflect irregularly or regularly, is formed on the reverse face of the transparent light guide component 22. This reflection pattern 28 works so that the area type light emitting device has an uniformity and not uneven characteristic by that the reflection pattern 28 reflects and diffuses the light inputted to the transparent light guide component 22 from the light source 10 to the outputting side. And the reflection component 26 is disposed at a state that the pattern side of the reflection pattern 28 is jointed with the reflection component 26. And the diffusion component 24 is disposed on the surface of the transparent light guide component 22, that is, on the outputting side of reflected light from the reflection component 26.

The reflection component 26 and the diffusion component 24 are a sheet type, or a film type, or a plate type resin material, and further the reflection component 26 has a glossy face, or a satin finish face, or a wrinkle face, or a foam surface of a white resin material or a metal film. And the diffusion component 24 works as a function diffusing light or collecting light depending on its object. And as a jointing means for jointing the transparent light guide component 22 with the reflection component 26, it is used that the transparent light guide component 22 and the reflection component 26 are welded by applying an ultrasonic wave or heat from the outside of the reflection component 26, at the same time when the reflection pattern 28 is formed on the reverse face of the transparent light guide component 22, by pressing a jig having the pattern of the reflection pattern 28 from the outside.

At the first embodiment of the area type light emitting device of the present invention, the process that the transparent light guide component 22 and the reflection component 26 are jointed and the process the reflection pattern 28 is formed can be unified and performed at the same time. Consequently, the reflection component 26 is fixed to the transparent light guide component 22 on the wide area. And at the jointing surface of the transparent light guide component 22 with the reflection component 26, air layers between the transparent light guide component 22 and the reflection component 26 exist at the parts where the reflection pattern 28 for reflecting regularly or irregularly the emitted light is not formed. With these air layers, the emitted light reflects effectively.

As mentioned above, according to the first embodiment of the area type light emitting device of the present invention, the manufacturing cost of the area type light emitting device can be reduced. Moreover, the bad effects caused by the displacement and peeling of the reflection component 26 for the transparent light guide component 22 can be avoided. Further, the inputted light to the transparent light guide component 22 from the light source 10 is not leaked from the transparent light guide component 22, and the inputted light can be used effectively.

And according to the first embodiment of the area type light emitting device of the present invention, the reflection component 26 is fixed to the transparent light guide component 22 by welding from the outside of the reflection component 26 at the same time when the reflection pattern 28 is formed on the reverse face of the transparent light guide component 22. With this, the tightness and fixation of the reflection component 26 to the transparent light guide component 22 at the reflection pattern 28 (welding part) are improved largely.

An ultrasonic wave welding or a heat welding is applied to the manufacturing of the area type light emitting device of the first embodiment of the present invention. The ultrasonic wave welding is a method in which the vibration generated by an ultrasonic wave is applied to a part by using a welding tool called horn, and the friction occurs at a part between the transparent light guide component 22 and the reflection component 26, and the welding is performed by the heat generated by this friction. The heat welding is a method in which the heat is generated by that a conductive or magnetic material and the transparent light guide component 22 and the reflection component 26 are placed in a high frequency magnetic field. Under this heat state, the jig formed the pattern of the reflection pattern 28 is pressed from the outside of the reflection component 26 at the same time when the transparent light guide component 22 and the reflection component 26 are welded, and after this, cooling is applied and the transparent light guide component 22 and the reflection component 26 are fixed.

As the other heat welding methods, there are methods such as a heat plate welding, a heat seal welding, and an impulse seal welding. These methods use a heat element having a large electric resistance, and make this heat element contact and press directly the welding part. With this, the transparent light guide component 22 and the reflection component 26 are softened and welded, and at this state the transparent light guide component 22 and the reflection component 26 are pressed and jointed. At the manufacturing method of the first embodiment of the area type light emitting device of the present invention, the welding process is adopted, therefore, a strong joint between the transparent light guide component 22 and the reflection component 26 can be obtained.

Figure 4:
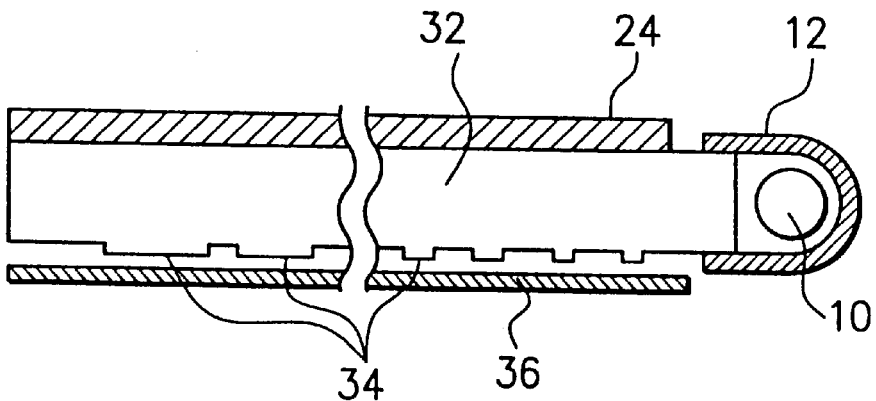
FIG. 4 is a sectional view of a second embodiment of an area type light emitting device of the present invention.
Figure 4:
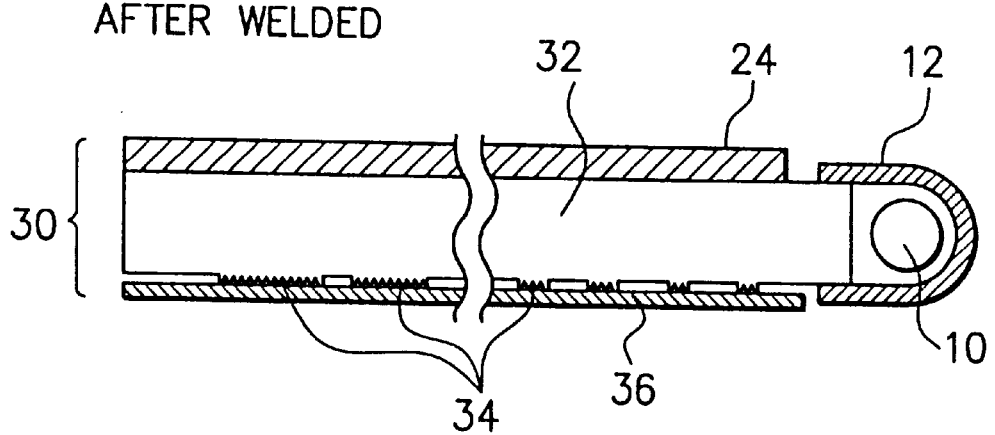

Next, a second embodiment of the area type light emitting device of the present invention is explained. FIG. 4 is a sectional view of the second embodiment of the area type light emitting device of the present invention. As shown in FIG. 4, the area type light emitting device of the second embodiment of the present invention consists of a pole type light source 10, a reflector 12 which reflects emitted light from the pole type light source 10 effectively, and a light guide unit 30 which makes light diffuse uniformly.

The light guide unit 30 consists of a transparent light guide component 32, a diffusion component 24, a reflection component 36, and a reflection pattern 34.

At the first embodiment of the area type light emitting device of the present invention shown in FIG. 3, the reflection component 26 is fixed to the transparent light guide component 22 by welding, at the same time when the reflection pattern 28 is formed on the transparent light guide component 22. However, at the second embodiment of the present invention, the reflection pattern 34 is formed on the transparent light guide component 22 beforehand, and the reflection component 36 is fixed to the transparent light guide component 32 having the reflection pattern 34 by welding.

As shown in FIG. 4, the reflection pattern 34 is formed on the reverse face of the transparent light guide component 32 beforehand. That is, the reflection pattern 34 is formed on the transparent light guide component 32, at the same time when the transparent light guide component 32 is formed by molding. And the pattern of the reflection pattern 34 is a dot type, or a line type, or a satin finish, and has a slight height from a plane where the pattern does not exist. The reflection component 36 is disposed so that the reflection component 36 contacts with the reflection pattern 34, and this contacted part is softened and welded by the ultrasonic wave welding or the heat welding.

At the manufacturing method of the second embodiment of the present invention, the welding is used to fix the reflection component 36 to the transparent light guide component 32 as a fixing means, and the reflection component 36 is fixed to the reflection pattern 34 which is formed at the same time when the transparent light guide component 32 is formed. Therefore, as the same as the first embodiment, at the second embodiment, the manufacturing cost is reduced, and bad effects such as the displacement and peeling of the reflection component 36 for the transparent light guide component 32 can be avoided. Further, the light inputted to the transparent light guide component 32 from the light source 10 does not leak at the transparent light guide component 32 and can be used effectively. Moreover, the reflection pattern 34 is formed on the transparent light guide component 32 beforehand, therefore a tool using for welding can be simplified. Therefore, the manufacturing cost at the welding is further reduced.

As mentioned above, according to the present invention, at an area type light emitting device, in which a reflection component is disposed on the reverse face of a transparent light guide component, and also a light source is disposed at the side of the transparent light guide component, makes light emit from the surface of the transparent light guide component by that emitted light from the light source is inputted to the transparent light guide component and the inputted light is reflected on the reflection component and the reflected light is passed through the surface of the transparent light guide component, at the time when a reflection pattern, which makes the emitted light from the light source reflect to the surface of the transparent light guide component, is formed on the reverse face of the transparent light guide component, the reverse face of the transparent light guide component and the reflection component are fixed by welding in a state that the reflection pattern is formed between the reverse face of the transparent light guide component and the reflection component. Therefore, the reflection component can be firmly fixed to the transparent light guide component, and the manufacturing cost can be reduced.

According to the present invention, at a manufacturing method of an area type light emitting device, in which a reflection component is disposed on the reverse face of a transparent light guide component, and also a light source is disposed at the side of the transparent light guide component, makes light emit from the surface of the transparent light guide component by that emitted light from the light source is inputted to the transparent light guide component and the inputted light is reflected on the reflection component and the reflected light is passed through the surface of the transparent light guide component, at the same time when a reflection pattern, which makes the emitted light from the light source reflect to the surface of the transparent light guide component, is formed on the reverse face of the transparent light guide component, the reverse face of the transparent light guide component and the reflection component are fixed by welding in a state that the reflection pattern is formed between the reverse face of the transparent light guide component and the reflection component. Therefore, a process that the reflection component is jointed with the transparent light guide component and a process that the reflection pattern is formed on the transparent light guide component can be unified, consequently, the manufacturing cost can be reduced and the reflection component can be firmly fixed to the transparent light guide component.

According to the present invention, at a manufacturing method of an area type light emitting device, in which a reflection component is disposed on the reverse face of a transparent light guide component, and also a light source is disposed at the side of the transparent light guide component, makes light emit from the surface of the transparent light guide component by that emitted light from the light source is inputted to the transparent light guide component and the inputted light is reflected on the reflection component and the reflected light is passed through the surface of the transparent light guide component, at the same time when the transparent light guide component is molded, a reflection pattern, which makes the emitted light from the light source reflect to the surface of the transparent light guide component, is formed on the reverse face of the transparent light guide component, and the reverse face of the transparent light guide component and the reflection component are fixed by welding in a state that the reflection pattern contacts with the reflection component. Therefore, a process that the reflection pattern is formed on the reverse face of the transparent light guide component is not required, consequently the manufacturing cost can be reduced, and the reflection component can be firmly fixed to the transparent light guide component by welding.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An area type light emitting device, comprising a reflection component disposed on a reverse face of a transparent light guide component, and a light source disposed at a side of said transparent light guide component, for making light emit from an emitting surface of said transparent light guide component by said emitted light from said light source input into said transparent light guide component, wherein said inputted light is reflected by a plurality of reflection patterns formed along portions of said reverse face of said transparent light guide component backed by corresponding portions of said reflection component, and said reflected light is passed through said emitting surface of said transparent light guide component, wherein:

said reflection patterns, which make said emitted light from said light source reflect to said emitting surface of said transparent light guide component, are formed on said portions of said reverse face of said transparent light guide component, and said portions of said reverse face of said transparent light guide component and said corresponding portions of said reflection component are joined by welding to form a continuous single piece construction.

2. A manufacturing method of an area type light emitting device, in which a reflection component is disposed on a reverse face of a transparent light guide component, and a light source is disposed at a side of said transparent light guide component, wherein light is emitted from an emitting surface of said transparent light guide component by the emitted light from said light source input into said transparent light guide component and said inputted light is reflected by a plurality of reflection patterns formed along portions of said reverse face of said transparent light guide component backed by corresponding portions of said reflection component, and said reflected light is passed through said emitting surface of said transparent light guide component, wherein:

said reflection patterns are formed on said reverse portions of said face of said transparent light guide component, and said portions of said reverse face of said transparent light guide component and said corresponding portions of said reflection component are joined by welding to form a continuous single piece construction.

3. A manufacturing method of an area type light emitting device, in which a reflection component is disposed on a reverse face of a transparent light guide component, and a light source is disposed at a side of said transparent light guide component, wherein light is emitting from an emitting surface of said transparent light guide component by the emitted light from said light source input into said transparent light guide component and said inputted light is reflected buy a plurality of reflection patterns formed along portions of said reverse face of said transparent light guide component backed by corresponding portions of said reflection component, and said reflected light is passed through said emitting surface of said transparent light guide component, wherein:

said reflection patterns are formed along said portions of said reverse face of said transparent light guide component when said transparent light guide component is molded, and said portions of said reverse face of said transparent light guide component and said corresponding portions of said reflection component are joined by welding to form a continuous single piece construction.

* * * * *